US007740566B2

(12) United States Patent
Nativ

(10) Patent No.: US 7,740,566 B2
(45) Date of Patent: Jun. 22, 2010

(54) HIP ASSIST WALKER

(75) Inventor: Avinoam Nativ, Dunrobin (CA)

(73) Assignee: Neuromuscular Gain Inc., Ottawa, Ontario (CA)

( * ) Notice: Subject to any disclaimer, the term of this patent is extended or adjusted under 35 U.S.C. 154(b) by 0 days.

(21) Appl. No.: 12/143,173

(22) Filed: Jun. 20, 2008

(65) Prior Publication Data

US 2009/0107533 A1 Apr. 30, 2009

(51) Int. Cl.
*A63B 22/20* (2006.01)
*A61H 3/00* (2006.01)
*B62M 1/00* (2010.01)

(52) U.S. Cl. ........................ 482/68; 280/87.021; 135/67

(58) Field of Classification Search .................... 482/51, 482/54, 66–71, 78, 80, 121, 124, 126, 904; 434/255; 119/770; 601/23–24, 27, 29, 32–35; 280/87.021, 87.051; 297/5–6; 135/67
See application file for complete search history.

(56) References Cited

U.S. PATENT DOCUMENTS 2,210,269 A * 8/1940 Taylor ......................... 601/33
2,327,671 A * 8/1943 Rupprecht ............. 280/87.021
5,467,793 A * 11/1995 Hart ............................ 135/67
5,588,456 A * 12/1996 Hart ............................ 135/67
5,967,944 A * 10/1999 Vittone et al. ................. 482/52
7,150,722 B1 * 12/2006 Tyrrell ......................... 602/23
7,422,550 B1 * 9/2008 Pinero et al. .................. 482/68

* cited by examiner

*Primary Examiner*—Loan H Thanh
*Assistant Examiner*—Oren Ginsberg
(74) *Attorney, Agent, or Firm*—Louis B. Allard; Borden Ladner Gervais LLP

(57) ABSTRACT

A wheeled walker for training an individual to walk by enabling hip flexion. The walker is equipped with a pulley located between two anchors points to which the ends of an elastic cord are attached a middle portion of the elastic cord runs over the pulley. A first harness for receiving a foot of the user is slidingly coupled to the segment of the elastic cord located between the first anchor point and the pulley. A similar harness for receiving the other foot of the user is slidingly coupled to the segment of the elastic cord located between the second anchor point and the pulley.

9 Claims, 5 Drawing Sheets

HIP ASSIST WALKER

CROSS REFERENCE TO RELATED APPLICATIONS

This application claims the benefit of priority of Canadian Patent Application No. 2,608,259 filed Oct. 26, 2007, which is incorporated herein by reference in its entirety.

FIELD OF THE INVENTION

The present invention relates generally to training apparatuses for users with limited mobility. Particularly, the present invention relates to an apparatus for training a person to walk by assisting their hip flexor muscles.

BACKGROUND OF THE INVENTION

In view of the aging population in the Western world, there is an increase in the number of people with limited mobility. These may be people post a neurologic or orthopedic trauma or even people whose muscles weaken and atrophy with disuse. They would typically rely on assistive devices to allow them to ambulate but the assistive devices are generally stabilizers and support structures—they do not typically provide a solution for specific gait problems. The resulting loss of mobility greatly interferes with the quality of life of these individuals and can lead to psychological and financial hardship.

Many of the individuals with limited mobility have the aptitude to regain some measure of mobility but lack the appropriate equipment to do so. Existing equipment such as standard walkers can help support an individual's weight bearing as he walks but does little with respect to training the muscles responsible for elevating or progressing the limb. As for existing types of body building equipment, they can help in strengthening targeted muscles but usually offer only resistance training, i.e., they provide an opposing force to the muscles being trained, they do not assist in flexing these muscles in any way. This constitutes a major hurdle for individuals who have lost most of their ability to control some key muscles used in walking, such muscles being, for example, the hip flexor muscles. Further, the existing equipment does not lend itself well to help individuals regain coordination of the different movements required in walking. Even with the help of assistive devices like walkers and canes, individuals who are not able to lift and progress their legs due to weak flexors, would not be able to ambulate and hence, would typically continue to atrophy and deteriorate. Strengthening the hip muscles in supine or in standing position is very important but even more important is to setup a training situation which is part of walking and coordinates in sequence the movements required for walking.

Therefore, it is desirable to provide an apparatus for training an individual to walk by assisting the individual in flexing the hips and by assisting in the coordination of the sequence of movements associated with walking.

SUMMARY OF THE INVENTION

It is an object of the present invention to obviate or mitigate at least one disadvantage of previous equipment used in training or assisting individuals to walk.

In a first aspect, the present invention provides an apparatus for training an individual to use muscles required for walking. The apparatus comprises a frame, an elastic cord and a coupling structure for coupling the elastic cord to the frame. The elastic cord has a first segment hanging from one side of the coupling structure, the first segment for coupling to a first lower extremity of the user. The elastic cord also has a second segment hanging from an opposite side of the coupling structure, the second segment for coupling to a second lower extremity of the user. A third segment of the elastic cord connects the first segment and the second segment, is in contact with the coupling structure and is movable with respect to the coupling structure. The elastic cord is for applying a first force to the first lower extremity, the first force having an upward vertical component and a forward horizontal component upon the first lower extremity being vertically and horizontally distant from the coupling structure, the first force for assisting the first lower extremity in an upward and forward movement upon the user attempting to lift the first lower extremity. The elastic cord is also for applying a second force to the second lower extremity, the second force having an upward vertical component and a forward horizontal component upon the second lower extremity being horizontally and vertically distant from the coupling structure, the second force for assisting the second lower extremity in an upward and forward movement upon the user attempting to lift the second lower extremity.

In a further aspect, the present invention provides walker for assisting an individual to use muscles required for walking. The walker comprises a frame, an elastic cord and a coupling structure for coupling the elastic cord to the frame. The elastic cord has a first segment hanging from one side of the coupling structure, the first segment for coupling to a first lower extremity of the user. The elastic cord also has a second segment hanging from an opposite side of the coupling structure, the second segment for coupling to a second lower extremity of the user. A third segment of the elastic cord connects the first segment and the second segment, is in contact with the coupling structure and is movable with respect to the coupling structure. The elastic cord is for applying a first force to the first lower extremity, the first force having an upward vertical component and a forward horizontal component upon the first lower extremity being vertically and horizontally distant from the coupling structure, the first force for assisting the first lower extremity in an upward and forward movement upon the user attempting to lift the first lower extremity and the walker being moved forward by the individual. The elastic cord is also for applying a second force to the second lower extremity, the second force having an upward vertical component and a forward horizontal component upon the second lower extremity being horizontally and vertically distant from the coupling structure, the second force for assisting the second lower extremity in an upward and forward movement upon the user attempting to lift the second lower extremity and the walker being moved forward by the individual.

In yet a further aspect, the present invention provides a kit for modifying a walker to provide a hip assist walker to train an individual to use muscles required for walking. The kit comprises an elastic cord and a coupling structure for coupling the elastic cord to the frame. The elastic cord has a first segment hanging from one side of the coupling structure, the first segment for coupling to a first lower extremity of the user. The elastic cord also has a second segment hanging from an opposite side of the coupling structure, the second segment for coupling to a second lower extremity of the user. A third segment of the elastic cord connects the first segment and the second segment, is in contact with the coupling structure and is movable with respect to the coupling structure. The elastic cord is for applying a first force to the first lower extremity, the first force having an upward vertical component and a forward horizontal component upon the first lower extremity being vertically and horizontally distant from the coupling structure, the first force for assisting the first lower extremity in an upward and forward movement upon the user attempting to lift the first lower extremity. The elastic cord is also for applying a second force to the second lower extremity, the second force having an upward vertical component and a forward horizontal component upon the second lower extremity being horizontally and vertically distant from the coupling structure, the second force for assisting the second lower extremity in an upward and forward movement upon the user attempting to lift the second lower extremity.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides an apparatus for training an individual to use muscles required in walking. The apparatus includes an elastic cord slidingly coupled to a frame that can be either fixed or mobile. The elastic cord attaches to each of the individual's lower extremities and exerts an upward and forward force on the lower extremities, thereby assisting the individual in flexing the muscles required in walking. The mobile version of the apparatus allows the individual to walk about while assisting the individual in flexing the required muscles. The apparatus described herein can be referred to, amongst others, as a hip-assist walker, a walking assist, a mobility assist, a mobility training apparatus, a muscle conditioning assist and, as a walking or mobility therapy device.

Figure 1:
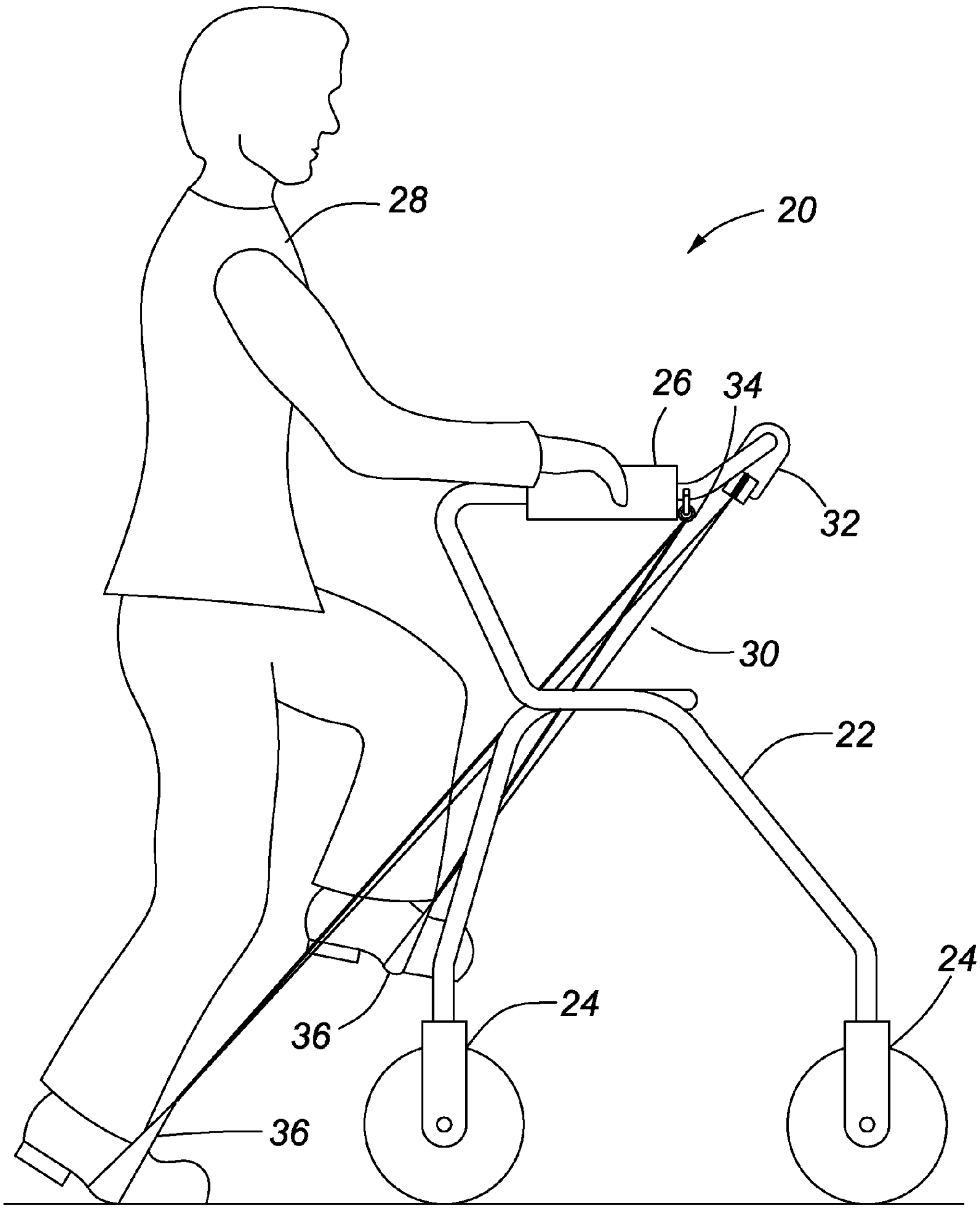
FIG. 1 shows a side view of an embodiment of the present invention as it is being used.

FIG. 1 shows a side-view of an in-use exemplary embodiment of a hip assist walker (HAW) 20 of the present invention. The HAW 20 includes a frame unit 22 having wheel assemblies 24, which can includes castor wheels or any other suitable type of wheels, and handles 26 that can be griped by a user 28. The frame unit 22 further includes a bungee cord 30 coupled to the frame unit 22 through a coupling structure including a pulley unit 32 secured to the frame 22 and anchors 34. As will be understood by a worker skilled in the art, any type of elastic cord, resilient cable, surgical tubing or elastomer material that is both elastic and resistive can be used instead of the bungee cord 30. The anchors 24 can be any suitable type of device or arrangement that can be used to fix the bungee cord 30 to the frame 22. Also shown at FIG. 1 are harnesses 36 slidingly coupled to the bungee cord 30 and to the feet of the user 28. For the purpose of the description, it is to be understood that the harness 36 can be any type of holder, loop, rest, sling or binding that allow the user's feet to couple to the bungee cord 30.

Figure 2:
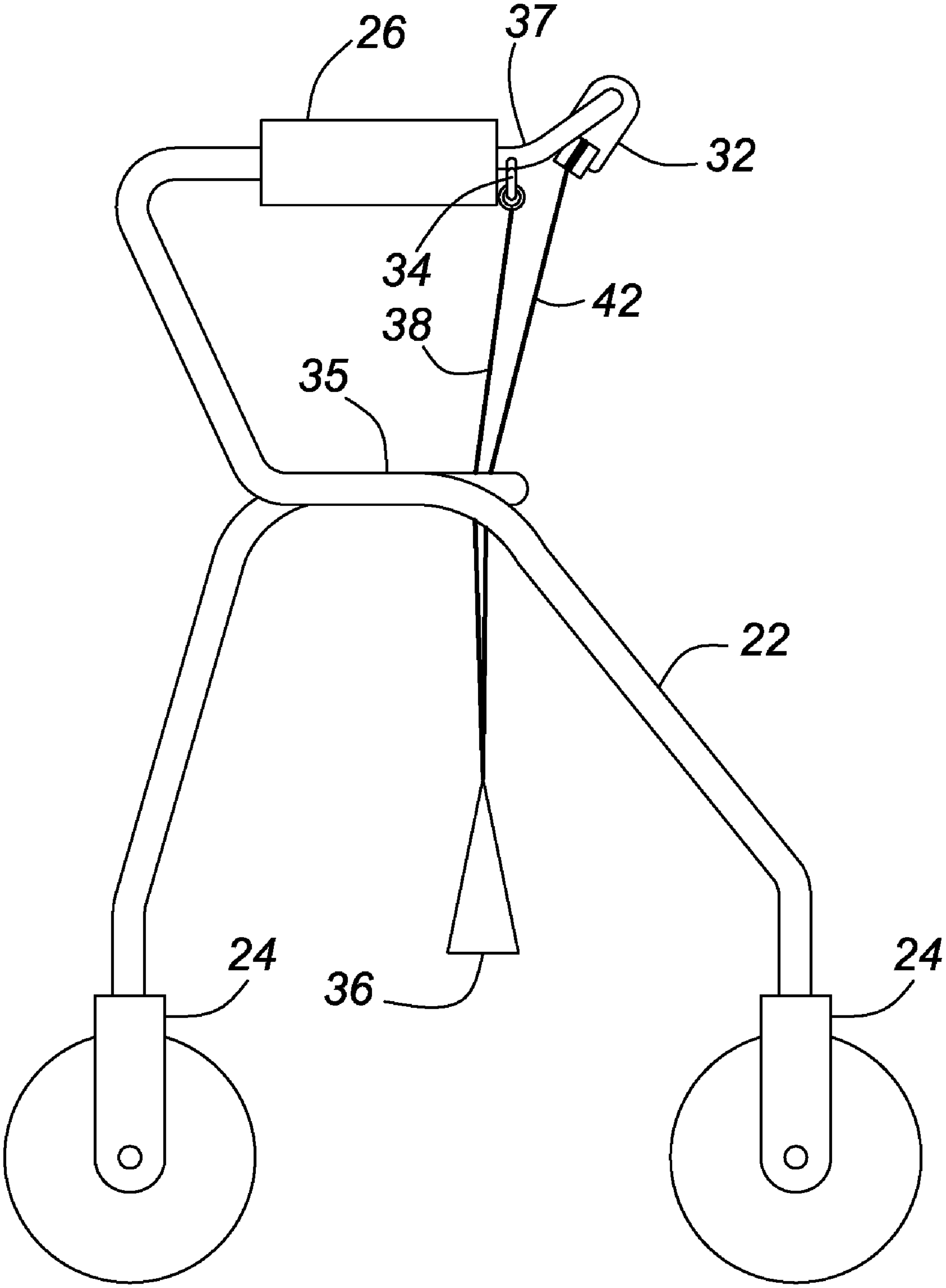
FIG. 2 shows a side view of the embodiment shown in FIG. 1 but at rest.
Figure 3:
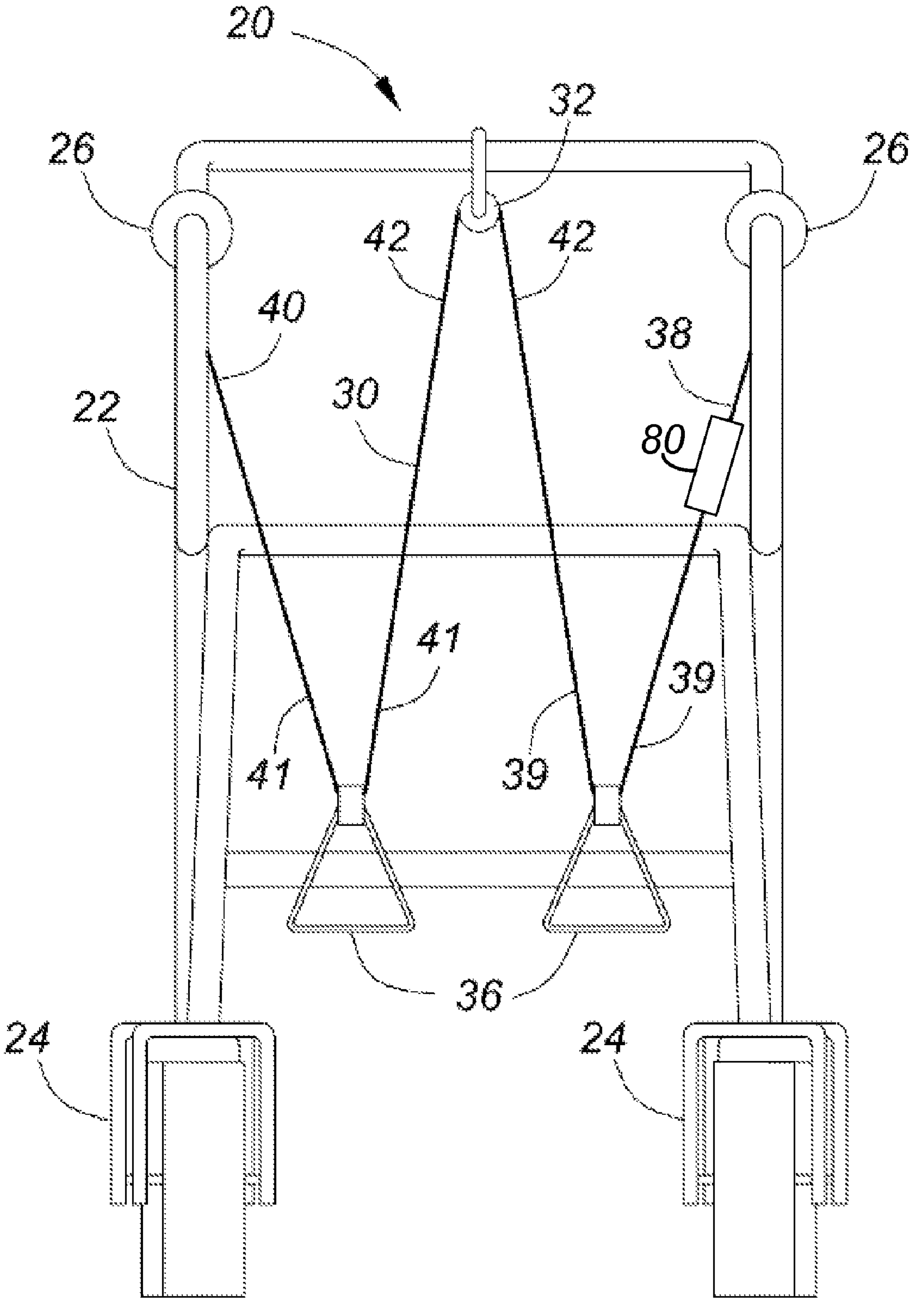
FIG. 3 shows a rear view of the embodiment of FIG. 2.

FIG. 2 is side-view of the HAW 20 (when not in use) where the bungee cord 30 is in its un-stretched state. FIG. 3 is a rear view of the HAW 20 shown at FIG. 2. FIG. 3 shows a first end portion 38 and a second end portion 40 of the bungee cord 30 secured to the frame 22 at the anchor points 34 (not visible in FIG. 2). FIGS. 2 and 3 also show a first segment 39 and a second segment 41 of the bungee cord 30 to which the harnesses 36 are slidingly coupled and a third segment 42 connected to the frame 22 through the pulley 32.

The following describes an exemplary method for a user to train using the HAW 20. To use the HAW 20, the user, perhaps with the assistance of a trainer or physical therapist, grabs the handles 26 and inserts each of his feet in respective harnesses 36. With his harnessed feet on the ground and next to each other, and therefore with the bungee cord 30 taunt, the user 28 pushes the HAW 20 forward and then, within his capabilities, shifts his weight to one leg and flexes his hip to lift the other leg, which can be referred to as the leading leg (in FIG. 1 the leading leg is the left leg and the leg to which the weight is shifted is the right leg. Further, the right leg can, in the example of FIG. 1, be referred to as the trailing leg). As forward motion of the user 28 and the HAW 20 progresses, the force produced by the tension in the bungee cord 30 assists the user 28 in moving the leading leg forward and up. Then, as in an unassisted walking motion, the user progressively shifts his weight forward and towards the side of the leading leg to push down on the harness 36. Simultaneously, the trailing leg (right leg) becomes progressively unloaded and, upon the left making contact with the ground, the user flexes his hip to lift the right leg, which is assisted in its movement by the bungee cord 30. In the course of training, the harness 36 coupled to the first segment 39 slides with respect to the first segment 39 and the other harness 36 coupled to the second segment 36 slides with respect to the second segment 36. As for the third segment 42 of the bungee cord, it moves over the pulley 32 during training. These relative movements of the first, second and third segments of the bungee cord 30 with respect to the harnesses 36 and the pulley 32 ensure that the tension along the bungee cord is substantially evenly distributed during training of the user 28.

As mentioned with respect to the HAW 20 and training method described above, the third segment 42 of the bungee cord 30 slides back and forth over the pulley 32 as the user 28 walks with the HAW 20. As will be understood by a skilled worker, the pulley 32 can be supplemented by additional pulleys to control the arrangement of the bungee cord 30 with respect to the frame 22. Further, a compound pulley can be used to divide the force applied by the bungee cord 30 to the legs of the user 28. Further yet, the pulley 32 can be replaced by an eyelet bolt (not shown) through which the bungee cord 30 passes or by any other suitable device allowing the third segment 42 of the bungee cord 30 to slide from one side of the HAW 20 to the other as the user walks with the HAW 20. The pulley unit 32 and any additional pulleys, eyelet bolts, or other suitable parts or devices used in coupling the bungee cord 30 to the frame 22 can be generally referred to as a coupling structure.

The pulley 32 and the anchor points 34 can be located anywhere on the frame 22 that will allow a user 32 to train with the HAW 20 in a manner that allows assisted use of hip flexor muscles. For example, the anchor points could be located on the frame 22 at location 35 (FIG. 2). Additionally, with the anchor points 34 located at location 35, additional pulleys (not shown) could be located at location 37 (FIG. 2) to guide the bungee cord 30 to location 35. Further, since users can come in all heights, the frame 28 can be made adjustable (not shown) through any suitable means to accommodate users of different heights. The arrangement of the pulley 32 and anchor points 34 can also be made adjustable in height to accommodate users of different heights.

The HAW 20 can be fitted with bungee cords of different lengths and strengths to provide training of adequate intensity for a user. The length of the bungee cord 30 can be made adjustable through any suitable means, shown as adjustment means 80 at FIG. 3, to provide further adjustment capability to the HAW 20. These types of adjustments allow a user to progressively decrease the degree of assistance provided by the HAW 20 by, for example, lengthening the bungee cord as he gains improved gait ability. Of course, once the user 28 becomes used to walking with the HAW, he can use the HAW to train in running.

The harnesses 36 shown in FIGS. 1 to 3 can be made of a closed loop of fabric defining a first aperture through which the bungee cord can be threaded and slide, and a second aperture dimensioned to receive a foot of the user 28. Any other suitable harness can also be used with the HAW 20. Further, as will be understood by the skilled worker, the user's feet can be coupled directly to the bungee cord 30 by having the user place the arch of his foot directly on the bungee cord. Further, even though the harnesses 36 are shown as coupled to the feet of user 28, it is possible to have similar harnesses coupled to any part of the user's lower extremities (legs). For example, harnesses could be used to couple the bungee cord 30 to the thighs, the knees, the lower legs and/or to the feet of the user 28.

Although not shown, the HAW 20 can be equipped with standard brakes to allow the user to stop the rolling motion of the HAW 20.

The HAW 20 embodiment of FIGS. 1 to 3 can also be used with the wheel assemblies 24 in locked position. That is, the user 28 can train while the HAW 20 remains stationary (this is similar to having a HAW without wheels or to having the pulley 32 and anchor points secured to an immobile structure). This option allows a beginner user to train with his legs coupled to each other through the bungee cord 30 and harnesses 36 without having to worry about the movement of the HAW 20. Once the user becomes used to moving his legs with the HAW 20 stationary, the wheel assemblies 24 can be unlocked and the user can begin to train his muscles by walking with the HAW 20.

Figure 4:
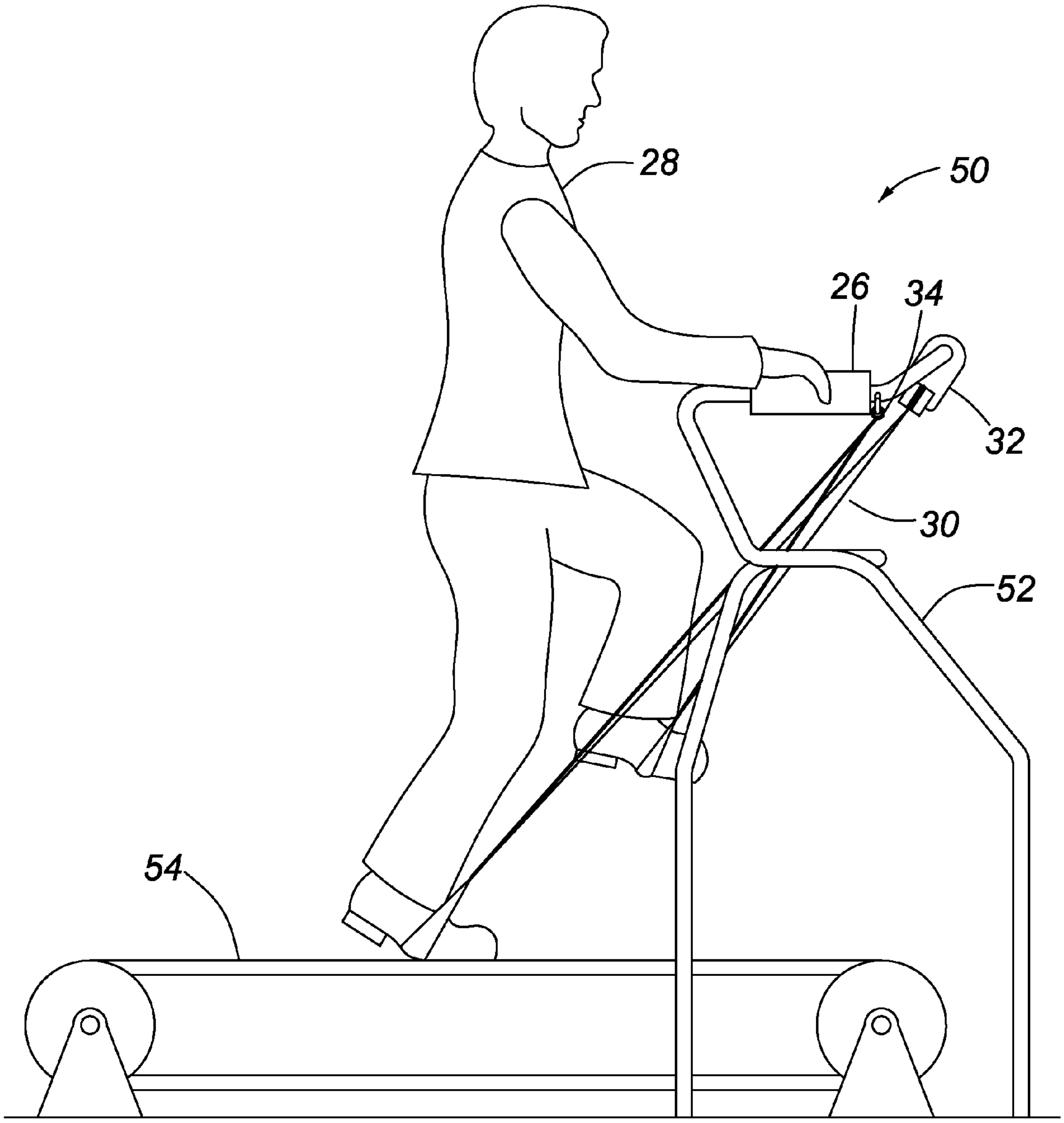
FIG. 4 shows a side view of another embodiment of the present invention.

FIG. 4 shows another exemplary embodiment of the present invention where a hip assist treadmill (HAT) 50 is shown. As for the HAW 20, the HAT 50 includes a frame 52 to which a bungee cord 30 is coupled through pulley 32 and anchors 34. The HAT 50 also includes a treadmill 54 which can be powered and controlled by the user 28, or by a therapist/trainer, in any suitable manner. The HAT 50 provides all the training advantages available to conventional treadmills. As will be understood by the skilled worker, these advantages include, for example, setting a treadmill speed, setting a training duration and setting a training intensity profile.

Figure 5:
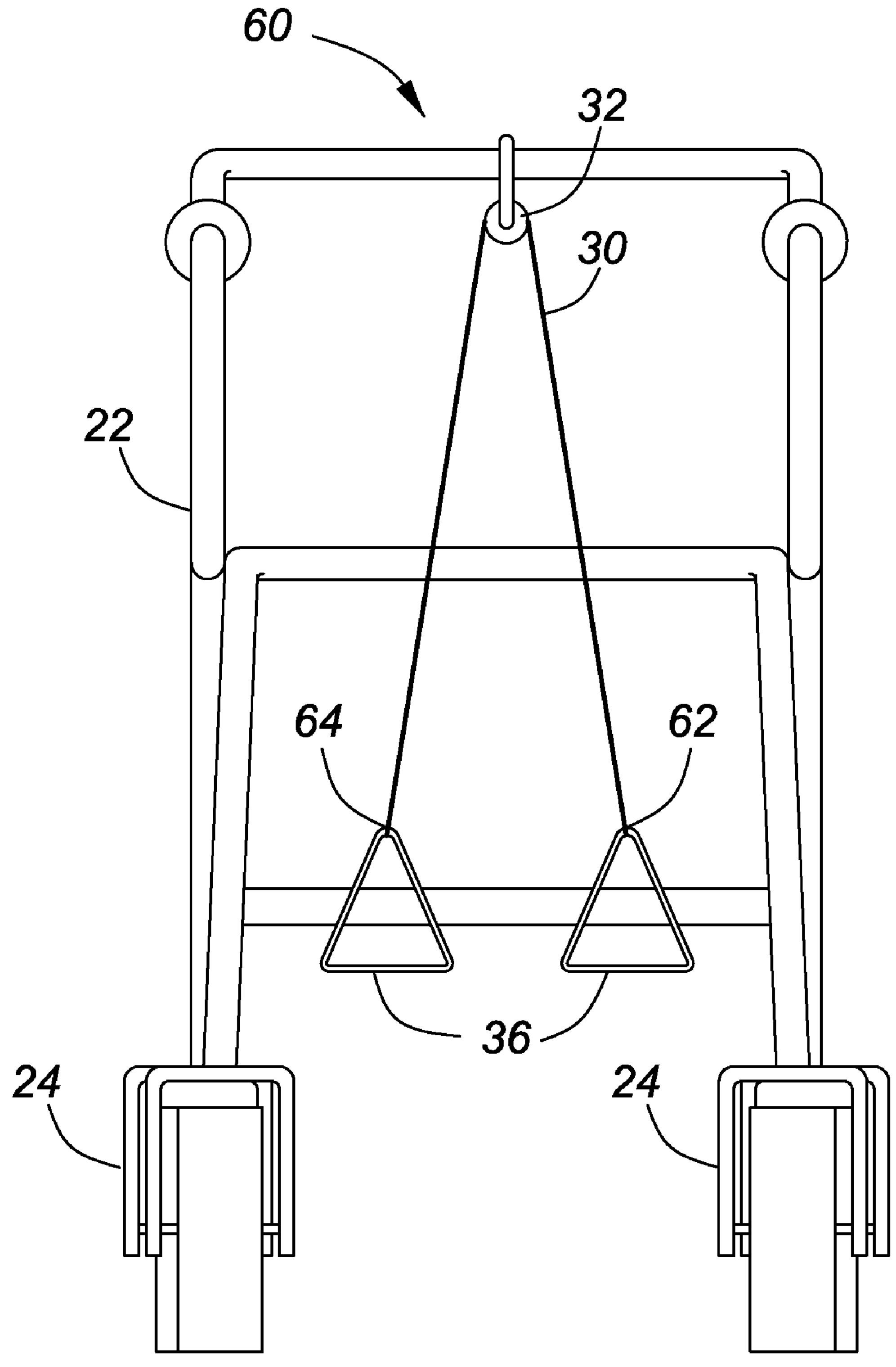
FIG. 5 shows a rear view of yet another embodiment of the present invention.

Yet another exemplary embodiment of the invention is shown at FIG. 5 where a HAW 60 has a pulley 32 and a bungee cord 30 with first segment 62 and second segment 64 secured to harnesses 36. As will be understood by the skilled worker the first and second segments 62 and 64 could be attached directly to the user's posterior limbs (lower extremities) without the use of harnesses 36.

The present invention can also be embodied in the form of a kit for retrofitting to a standard walker or to an existing treadmill. As will be understood by the skilled worker, the kit in question would include a bungee cord 30, harnesses 36, a pulley 32 and any additional anchors and materials required to adapt a standard walker or existing treadmill into the training apparatuses described above.

As described, the present invention provides an apparatus for training (and/or conditioning, assisting etc.) an individual to use muscles required in walking. The apparatus includes an elastic cord slidingly coupled to a frame that can be either fixed or mobile. The elastic cord attaches to each of the individual's lower extremities and exerts an upward and forward force on the lower extremities, thereby assisting the individual in flexing the muscles required in walking. The mobile version of the apparatus allows the individual to walk about while assisting the individual in flexing the required muscles.

In the above description, for purposes of explanation, numerous details have been set forth in order to provide a thorough understanding of the present invention. However, it will be apparent to one skilled in the art that these specific details are not required in order to practice the present invention.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An apparatus to train a user to use muscles required for walking, the apparatus comprising:

a wheeled frame to be pushed forward by the user while training;

an elastic cord having a first segment, a second segment and a third segment, the third segment interconnecting the first and second segments;

a first harness coupled to the first segment;

a second harness coupled to the second segment; and a coupling structure to couple the elastic cord to the wheeled frame, the first segment and the first harness depending from one side of the coupling structure, the first harness to couple to a first lower extremity of the user, the second segment and the second harness depending from an opposed side of the coupling structure, the second harness to couple to a second lower extremity of the user, the third segment interacting with the coupling structure, the third segment being movable with respect to the coupling structure, the first harness being slidable with respect to the first segment, and the second harness being slidable with respect to the second segment to ensure that tension in the elastic cord is substantially evenly distributed during training, the elastic cord to apply a first force to the first lower extremity, the first force having an upward vertical component and a forward horizontal component upon the wheeled frame being pushed forward, and the first lower extremity being vertically and horizontally distant from the coupling structure, the first force to assist the first lower extremity in an upward and forward movement upon the user shifting his weight from the first lower extremity to the second lower extremity and attempting to lift the first lower extremity, the user progressively shifting his weight from the second lower extremity to the first lower extremity to lower the first lower extremity while stepping forward with the first lower extremity, the elastic cord also to apply a second force to the second lower extremity, the second force having an upward vertical component and a forward horizontal component upon the user having stepped forward with the first lower extremity and the weight of the user being on the first lower extremity, the second force to assist the second lower extremity in an upward and forward movement upon the weight of the user being on the first lower extremity and the user attempting to lift the second lower extremity.

2. The apparatus of claim 1 wherein the coupling structure includes a pulley over which the third segment moves.

3. The apparatus of claim 1 wherein the first harness is to couple to at least one of a foot, a lower leg, a knee and a thigh of the first lower extremity and the second harness is for coupling to at least one of a foot, a lower leg, a knee and a thigh of the second lower extremity.

4. The apparatus of claim 1 wherein the wheeled frame includes a handle portion to be grabbed by the user while training.

5. The apparatus of claim 1 wherein the elastic cord includes first and second end regions each secured to the wheeled frame.

6. The apparatus of claim 1 wherein the elastic cord includes a bungee cord.

7. The apparatus of claim 1 wherein the coupling structure includes an adjustment means for adjusting a length of the elastic cord.

8. A hip-assist walker for assisting an individual to walk, the hip-assist walker comprising:

a wheeled frame to be pushed forward by the user while walking;

an elastic cord coupled to the feet of the user at spaced-apart segments of the elastic cord; and a pulley coupling the elastic cord to the frame at an intermediate segment of the elastic cord situated between the spaced-apart segments of the elastic cord, the intermediate segment being engaged by the pulley, the intermediate segment being movable with respect the pulley to ensure that tension in the elastic cord is substantially evenly distributed during walking, the elastic cord to apply a first force to a first foot of the user, the first force having an upward vertical component and a forward horizontal component upon the wheeled frame being pushed forward, and the first foot being vertically and horizontally distant from the pulley, the first force to assist the first foot in an upward and forward movement upon the user shifting his weight from his first foot to his second foot and lifting his first foot, the elastic cord also to apply a second force to the second foot, the second force having an upward vertical component and a forward horizontal component upon the user having stepped forward with his first foot and the weight of the user being on his first foot, and the second foot being horizontally and vertically distant from the pulley, the second force to assist the second foot in an upward and forward movement upon the weight of the user being on his first foot and the user lifting his second foot.

9. A kit to modify a walker, to provide a hip-assist walker to train an individual to use muscles required for walking, the kit comprising:

an elastic cord; and a pulley coupling the elastic cord to a wheeled frame of the walker at an intermediate segment of the elastic cord situated between the space-apart segments of the elastic cord, the intermediate segment being engaged by the pulley, the intermediate segment being movable with respect the pulley to ensure that tension in the elastic cord is substantially evenly distributed during walking, the elastic cord to apply a first force to a first foot of the user, the first force having an upward vertical component and a forward horizontal component upon the wheeled frame being pushed forward, and the first foot being vertically and horizontally distant from the pulley, the first force to assist the first foot in an upward and forward movement upon the user shifting his weight from his first foot to his second foot and lifting his first foot, the elastic cord also to apply a second force to the second foot, the second force having an upward vertical component and a forward horizontal component upon the user having stepped forward with his first foot and the weight of the user being on his first foot, and the second foot being horizontally and vertically distant from the pulley, the second force to assist the second foot in an upward and forward movement upon the weight of the user being on his first foot and the user lifting his second foot.

* * * * *

UNITED STATES PATENT AND TRADEMARK OFFICE

CERTIFICATE OF CORRECTION

PATENT NO. : 7,740,566 B2
APPLICATION NO. : 12/143173
DATED : June 22, 2010
INVENTOR(S) : Avinoam Nativ It is certified that error appears in the above-identified patent and that said Letters Patent is hereby corrected as shown below:

On the cover page, insert -- (30) Foreign Application Priority Data
Oct. 26, 2007...(CA)......................2,608,259 --

Signed and Sealed this

Seventh Day of September, 2010

David J. Kappos
*Director of the United States Patent and Trademark Office*